United States Patent [19]
Liman

[11] 4,334,320
[45] Jun. 8, 1982

[54] TRAFFIC INFORMATION RADIO SIGNAL RECEIVER

[75] Inventor: Helmut Liman, Nordstemmen, Fed. Rep. of Germany

[73] Assignee: Blaupunkt-Werke GmbH, Hildesheim, Fed. Rep. of Germany

[21] Appl. No.: 210,323

[22] Filed: Nov. 25, 1980

[30] Foreign Application Priority Data

Dec. 14, 1979 [DE] Fed. Rep. of Germany ....... 2950284

[51] Int. Cl.[3] ............ H04B 1/16
[52] U.S. Cl. ............ 455/227; 340/33
[58] Field of Search ............ 455/31, 35, 226-228, 455/344, 345; 340/33, 171 R

[56] References Cited

U.S. PATENT DOCUMENTS 3,949,401 4/1976 Hegeler et al. ............ 455/227
4,238,778 12/1980 Ohsumi ............ 455/227

OTHER PUBLICATIONS

"Traffic–News Decoder for Radios Undercuts Competition at $36" by Anon, Electronics vol. 50, No. 4 2/17/1977.

*Primary Examiner*—Jin F. Ng
*Attorney, Agent, or Firm*—Frishauf, Holtz, Goodman & Woodward

[57] ABSTRACT

To simulate presence of a traffic information signal in a traffic information receiver which is muted upon reproduction of tape cassette programs or operated at a predetermined level, a momentary-operating control button is connected to a timing circuit to establish a timing interval which, when exceeded, provides a signal to a traffic information transfer switch to transfer the signals received from the receiver through the traffic information channel to permit setting of the volume level under traffic information conditions as desired and to demonstrate the operability under such conditions; upon release of the button, the system reverts to reproduction of tape or traffic information signals received by the receiver. Traffic information can thus be simulated even though no traffic information is being radiated by the transmitter to which the receiver is tuned.

6 Claims, 2 Drawing Figures

TRAFFIC INFORMATION RADIO SIGNAL RECEIVER

Figure 1:
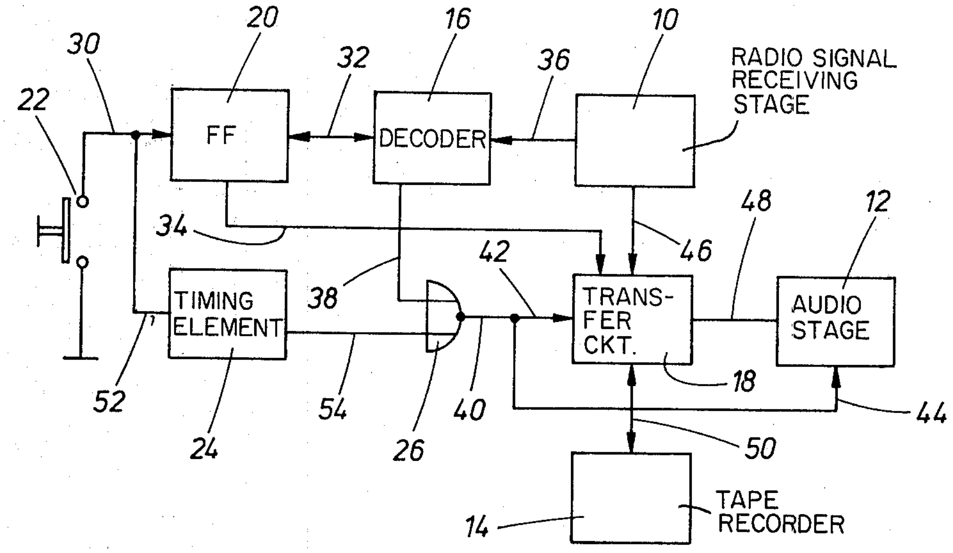

Reference to related patent, assigned to the assignee of this application, the disclosure of which is hereby incorporated by reference: U.S. Pat. No. 3,949,401, HEGELER et al.

The present invention relates to a traffic information radio receiver, and more particularly to a circuit to simulate a traffic information signal in a receiver of the type described in the referenced U.S. Pat. No. 3,949,401, HEGELER et al.

BACKGROUND AND PRIOR ART

The referenced U.S. Pat. No. 3,949,401 describes radio equipment useful in the field of broadcast traffic information systems including a decoding circuit which checks if a transmitter radiates a particular region identification frequency and further checks for the presence of traffic announcement identification frequencies.

Radio traffic information, on specific frequencies and, preferably, in the FM band, are becoming more widespread. A suitable receiver, as explained in the aforementioned patent, includes a radio signal receiving stage which provides program signals and traffic information signals to an audio stage for, respectively, reproduction thereof. A traffic information decoder is provided responsive to predetermined signals received by the receiving stage to provide traffic information control signals to a transfer circuit connected to transfer to the audio stage either program signals, such as entertainment, news and the like, or traffic information signals. The circuit may, additionally, be used to transfer to an audio stage signals derived from magnetic tape transducers, for example an audio cassette recorder. If it is not desired to utilize the traffic information feature of the receiver, then a switch is provided to disable the traffic information portion.

The receivers to which the present invention relate utilize codes or frequencies to characterize regions characteristic of certain listening areas, within which a specific transmitter can be received, and to characterize the traffic information content, namely that a specific transmitter is not then radiating general program material but, rather, a traffic information. In accordance with the system described in the aforementioned patent, traffic information transmitters, together with program information, additionally radiate a specific transmitter code for all traffic information and, in addition and regionally separate, a further signal which is representative only of the receiving area of the respective transmitter. The signal which is standard for the entire system is radiated only if a traffic information bulletin, or the like, is to be radiated.

The respective signals are decoded in the receiving decoders. Various types of such decoders have been proposed. In one simple type, the general signal type identification is decoded and, in addition thereto, the regional signal. These decoders can readily be tuned to receive, for example in an automobile radio, the respective transmitters which have been assigned the task of radiating traffic information.

Radio receivers which have the traffic information decoding feature frequently include a switch, typically operated as a momentary-contact pushbutton which, when operated and upon transmission of traffic information, will disable transfer of radiated program signals to the receiver, that is, by muting the program signal. To insure that the user will listen to and adequately hear the traffic information transmission, the level of reception is raised, even though the user may have set the receiver at a low level, for example to hear only "background music". If the receiver in a vehicle is a tape recorder - receiver combination, then, additionally, the audio signal from the tape recorder can be interrupted and, if desired, the playback unit can be stopped as well so that, upon receipt of a traffic information, any recording which is being reproduced is interrupted at that point, permitting resumption from the stop point when the traffic information transmission has terminated.

The minimum volume level at the audio amplifier for reproduction of traffic information must be set. This requires that, during installation and testing, the receiver can actually receive a traffic information transmission. This, however, can occur only if there are traffic information signals on the air.

In order to test or demonstrate automobile radios having the traffic information feature during a pause of traffic information signals, it is desirable to be able to set the minimum volume level of the receiver portion for the traffic information independently of transmission of traffic information itself; such traffic information cannot always be predicted since it may occur at random times in accordance with emergencies, metereological conditions or the like. It is also desirable to be able to set a minimum volume level for the audio reproduction already at the factory or at least at the time of installation of a specific radio receiver in an automobile.

THE INVENTION

It is an object to provide a circuit in which a minimum audio level can be set at which traffic information will be reproduced independently of the actual radiation of traffic information signals and, preferably, while utilizing already existing components of such receivers to the maximum possible extent, so that the additional costs will be a minimum and simplicity and hence reliability of the overall circuit will result.

Briefly, in accordance with the invention, a level simulating circuit for traffic information signals even in the absence of such signals is provided which includes a timing element connected and controlled by the control switch which is present, anyway, to set the receiver traffic information signals. When the control switch is operated for a period of time in excess of the predetermined timing interval of the control switch, a connection is established providing simulated traffic information signals to the audio stage so that, at that time, the minimum level thereof can be set. This can be accomplished, for example, by connecting program signals received by the radio receiver stage, that is, the RF (IF, etc.) stages, to the transfer stage and so setting the transfer stage that this signal is not processed as a program signal but, rather, like a traffic information signal. The transfer switch, of course, can be simple, e.g. a solid-state or mechanically operated relay, and is present in the receiver anyway. For a detailed disclosure, reference is made to U.S. Pat. No. 3,949,401.

The system has the advantage that the circuit which controls simulation—except for the timing circuit—is present anyway. The momentary operating switch which is used to enable the traffic information sensing portion of the receiver is present. Ordinarily, it is operated only momentarily, for example to set a flip-flop (FF), or to reset the flip-flop to, respectively, either enable the receiver to receive traffic information or to prevent its receipt. The time delay circuit itself can utilize components already present in the decoder so that a traffic information signal is passed through the receiver and through the audio stage if the traffic enabling pushbutton is operated for a period of time which exceeds the time constant of the timing circuit.

The timing circuit has the advantage that ordinary momentary operation will not affect the system; for testing, calibration, or for demonstration of the system, however, it need be depressed only for a period of time exceeding the timing constant, for example several seconds or longer.

The system, rapidly and simply, permits exact calibration of the minimum volume level at which traffic information is to be received at any time and entirely independently of actual receipt of a traffic information announcement, bulletin, or the like, which is being radiated. Thus, even though the receiver is muted or a cassette recorder portion thereof is muted or interrupted, the minimum volume level at which traffic information bulletins will be received can be determined at any time.

The system easily permits testing at the point of manufacture of the receiver, or upon installation into an automobile; the owner of the automobile with the receiver can readily individually adjust the minimum volume level; further, during sales demonstrations, the entire concept of receipt of traffic information by merely having one's auto radio "on" and tuned to a selected station can be graphically shown; the actual traffic announcement could be simulated, for example, by a recording on a special magnetic tape cassette.

DRAWINGS

Figure 2:
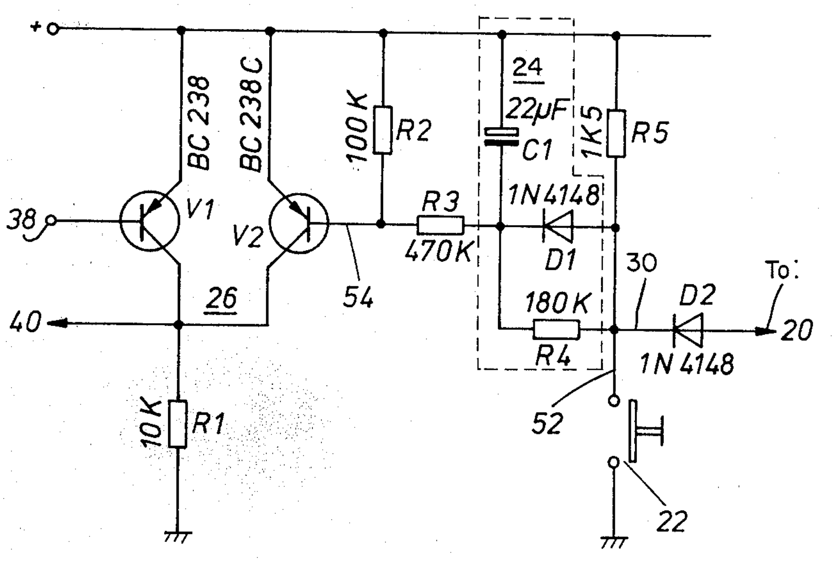

FIG. 1 is a general block circuit diagram of a traffic information radio receiver in which an information signal simulating circuit is included; and FIG. 2 is a fragmentary detailed circuit diagram showing an OR circuit with time delay and illustrating the portion of the system of FIG. 1 which is specific to the present invention.

The essential portions of an FM automobile receiver are shown in FIG. 1, and include a receiving portion 10, having an RF stage, the associated mixer, intermediate frequency, demodulator, etc. stages, to provide an audio signal to an audio stage 12 which includes loudspeakers and the like. Various control adjustments for tuning of receiver, gain and volume control, stereo reception, etc., are included but not shown since they can be installed and connected in accordance with any well known circuit arrangement. The system can readily be used together with cassette or cartridge tape recorders, and unit 14 shows, in block form, a cassette tape unit including the drive motor thereof. It can be of any well known standard construction.

The receiver stage 10 is connected through a line 36 to a decoding circuit 16. Circuit 16 decodes from the composite signal a traffic announcement identification frequency, which can be termed a "DK" signal. The region identification signal is termed a "BK" signal and the specific transmitter designation is recognized by an "SK" signal. Decoder 16, thus, provides an output which recognizes the transmitter (signal SK), the geographic region (signal BK) and the fact that a traffic information signal is being radiated (DK signal). The receiver stage 10 is connected to a low-frequency transfer switch 18, the connection position of which is controlled by a switch which, preferably, is a flip-flop 20, the state of which is controlled by a momentary-operating pushbutton 22.

In accordance with the present invention, the circuit is expanded by including, additionally, a timing circuit 24 and an OR circuit or gate 26.

A connecting line 30 connects the FF 20 to switch 22. Line 32 connects the decoding circuit 16 with a locking input of FF 20, which is locked in one state when the receiver is either connected for AM reception or when the receiver is connected to an FM transmitter which does not participate in the traffic information system, that is, which does not provide a specific SK signal which can be decoded. A connecting line 34 is provided which, when FF 20 is SET, connects a muting signal to the transmission muting input of the transfer switch 18, that is, to inhibit transmission of a program signal from the stage 10 to the audio stage 12.

In one system presently operating in the Federal Republic of Germany, the SK signal is radiated at 57 kHz, which is applied over line 36 from stage 10 to the decoder 16. The decoder 16, in turn, is connected by line 38 to OR-circuit 26 and then through the OR-circuit 26 by line 40 to the transfer switch 18. A signal from the decoding circuit 16 on line 38, applied to an input 42 of transfer switch 18, is applied to the audio amplifier 12. For traffic information, the audio amplifier 12 should have a certain minimum level, which may be substantially louder than the setting controlled by the operator, so that the operator will not, inadvertently, miss a traffic announcement. Switch 18, thus will switch through traffic announcements from stage 10 to stage 12 for reproduction at a heightened level if decoder 16 has decoder the presence of such a signal.

The stage 10, thus, will transfer its signals through line 46 to the transfer switch 18 and over line 48 to the audio amplifier 12. If a traffic information signal has been decoded, the output from decoder 16 will also be applied through line 38, OR-stage 26, line 40, and over line 44 to the audio stage 12 to raise its level—bypassing the transfer switch 48 which is provided to mute program content of the transmitter and/or transmissions from the tape recorder 14. The output from decoder stage 16 thus will be applied in parallel to the transfer switch 18 and to the audio stage 12, respectively, so that the audio stage can have an audio output volume level independently of that which is set for reproduction of programs when no traffic information is being received. The line 50, connected between the tape or cassette unit 14 and switch 18 which, in one line, symbolically is provided to include the various change-over features and control features for a tape recorder, as is well known. The line 50 also is connected to the transfer switch so that the transfer switch 18 can effect all transfer switching functions of the program signals of the receiver, programs being reproduced from the recorder stage 14, and traffic information.

In accordance with the invention, a line 52 is connected to line 30 which connects switch 22 and the FF 20. Line 52 connects to a timing unit 24, having an output 54 which likewise is connected to the OR-stage or gate 26 and hence to the control input 42 of the transfer switch 18 on the one hand, and through line 44 to the audio stage 12, on the other.

In accordance with the preferred embodiment, as shown, the connection from the timing element 24 is directly through OR-gate 26 which, additionally, is connected to the decoding circuit 16 so that a signal can be applied thereto also by line 38.

Basic Operation: Let it be assumed that the stage 10 is tuned to a transmitter which radiates program signals and, if necessary, information signals. The receiver operates, for example and preferably, in the FM range. Upon momentary operation of switch 22, the information recognition FF 20 will be SET; a subsequent operation will RESET the FF. The state of the FF is preferably visually indicated by a suitable indicator (not shown). When the FF 20 is SET, the program content received by the stage 10 can be muted and the audio level of stage 12 is either muted or placed at a very low level. Reproduction of stored tape signals from the tape recorder element 14 over line 50 is not thereby affected, so that the volume with which tape is being reproduced can be set as desired by the user.

When the FF 20 is SET, the receiver is ready to receive traffic information which may occur when the receiver is muted and/or reproduction is obtained from a cassette from stage 14.

If the decoding circuit 16 then recognizes or decodes that a traffic information signal is present, control input 42 of the transfer switch 18, due to the connection of lines 38, 40, is caused to connect the output from the stage 10 and raise the volume level thereof over input 44, and effect transmission of signals to stage 12. If the tape recorder feature has been in operation, reproduction from tape is interrupted, for example by opening a relay contact and, preferably, the tape transport mechanism likewise is stopped. If the volume at which the unit was operating was low, then a minimum volume will be commanded, so that the overall reproduced volume will be heard at an increased level regardless of the previously set level by increasing the base level of reproduction of the audio amplifier 12.

In accordance with the present invention, the circuit readily permits adjustment of the minimum loudness level, or a base amplification level of stage 12 independently of presence of a transmission representing an information signal. To obtain this recognition, switch 22 is depressed for a period of time which exceeds the timing interval or time period of the timing element 24. After elapse of this timing interval, a simulated traffic information signal will be applied from the output 54 of the timing unit 24 through the OR-circuit 26 and line 40 to input 42 of transfer switch 18, which can then readily be adjusted to a minimum output, or amplification level, respectively. Likewise, adjustment may be effected at the amplifier 12 at its input 44, if desired.

A simple and effective and preferred circuit for the system of FIG. 1 is shown in FIG. 2. Capacitor C1 and resistor R4 form the timing circuit 24 (FIG. 1). A voltage divider R2/R3 for the voltage on capacitor C1 permits use of a capacitor of small capacity value. Transistor V1, present in the decoder anyway, together with resistor R1 connected to the collector of transistor V2, forms the OR-circuit. Positive supply voltage is indicated by the symbol +.

The inputs to the OR-gate are labeled with the same reference numerals as those of FIG. 1; thus, the signal 38 from the decoding circuit 16 is applied to the base of transistor V1; the signal on line 54 from the timing circuit is applied to the base of transistor V2. The output 40 of the OR-circuit is connected to the input 42 of transfer switch 18 and to the input 44 of the audio amplifier 12.

The connection for the set/reset circuit 20 has a decoupling diode D2 connected thereto to decouple the information recognition FF 20 from the timing circuit C1/R4.

Operation: Momentary engagement of the switch 22 will cause the FF 22 to SET. Continued engagement of the switch 22, however, will provide a charge current to flow over resistor R4 to capacitor C1 which will receive a voltage which, when the voltage division ratio determined by the voltage divider R2/R3 is exceeded, will cause transistor V2 to become conductive, and thus simulate presence of an information signal. A true information signal is obtained by controlling transistor V1 to conduction by applying a suitable signal from line 38 to its base. Upon release of switch 22, capacitor C1 quickly discharges over diode D1 and resistor R5, so that simulation of a traffic information signal is immediately terminated upon release of the switch 22. The voltage divider formed by resistor R5 and diode R1 additionally provides for rapid discharge of the capacitor C1 in case the operator should frequently touch and rapidly sequentially operate the switch so that the capacitor will always rapidly discharge thereby and thus not build up a voltage which, unintentionally, might simulate a traffic information signal, bulletin or announcement.

The circuit can be constructed of but few and inexpensive components. Suitable circuit values and component designations are shown in the drawing, FIG. 2 and, as so constructed, operated satisfactorily. The circuit can be incorporated with hardly any additional costs in any traffic information receiver, and can also be constructed in form of an integrated circuit, and integrated with existing circuits.

Various changes and modifications may be made within the scope of the inventive concept.

I claim:

1. In a radio receiver having a radio signal receiving stage (10) providing program signals and traffic information signals, an audio stage providing audio output signals, a traffic information decoder (16) responsive to predetermined signals received by said receiving stage and then providing a corresponding traffic information control signal;

a transfer circuit (18) connected to the radio receiving stage (10) and the audio stage to transfer signals from the receiving stage to the audio stage, and being connected to and controlled by the traffic information control signal to, selectively, inhibit transfer of program signals and instead transfer traffic information signals to the audio stage;

and a control switch (20, 22) controlling, respectively, response of the decoder (16) and hence selective transfer of program signals and/or information signals to the audio stage, an information signal reproduction level simulation circuit to simulate traffic information signals for reproduction by the audio stage in the absence of said predetermined signals to which the decoder (16) responds, comprising a timing element (24) connected to and controlled by said control switch and upon operation thereof for at least a predetermined time interval providing an output;

and connection means (54, 26) controlled by said timing element output after elapse of the predetermined interval to apply a traffic information simulating signal to said transfer circuit (16) for subsequent reproduction by the audio stage.

2. Radio receiver according to claim 1, wherein said connection means include an OR-gate (26; V1, V2, R1) connected to the timing element (24) and to the decoder (16) for selective control of the transfer circuit (18) by either said traffic information control signal or an output signal from said timing element.

3. Radio receiver according to claim 2, wherein said decoder (16) includes a transistor (V1);

and wherein the OR-gate (26) includes said transistor as a component thereof.

4. Radio receiver according to claim 2 or 3, further including a decoupling circuit (D2) connected between the timing element (24) and the control switch (20, 22), the control switch controlling the response of the traffic information decoder (16).

5. Radio receiver according to claim 1, wherein said radio receiver additionally includes a tape recording stage (14) connected to apply recorded program signals to said transfer circuit (18) for selective connection to the audio stage (12), said transfer circuit transferring signals, selectively, from the receiving stage (10) and/or the tape recording stage (14) to the audio stage and being connected to and controlled by the traffic information control signal to, selectively, inhibit transfer of program signals from the receiving stage or recorded program signals from the recording stage (14) and instead transfer traffic information signals to the audio stage in dependence on whether the decoder senses said predetermined signals and provides said transfer information control signal;

and wherein the level simulation circuit, upon operation of said control switch for at least said predetermined time interval transfers recorded program signals from said recording stage (14) through said transfer circuit to the audio stage to form said traffic information simulating signal under control of the output from the timing element.

6. Radio receiver according to claim 1, wherein the level simulating circuit, upon operation of said control switch for at least said predetermined time interval, transfers program signals from the receiving stage (10) through said transfer circuit to the audio stage (12) to form said traffic information simulating signals under control of the output from the timing element.

* * * * *